United States Patent
Guering

(10) Patent No.: US 10,828,760 B2
(45) Date of Patent: Nov. 10, 2020

(54) METHOD FOR ALIGNING A FIRST HOLE OF A FIRST PART WITH A SECOND HOLE OF A SECOND PART AND KIT FOR ITS IMPLEMENTATION

(71) Applicant: AIRBUS OPERATIONS (S.A.S.), Toulouse (FR)

(72) Inventor: Bernard Guering, Montrabe (DE)

(73) Assignee: Airbus Operations (S.A.S.), Toulouse (FR)

( * ) Notice: Subject to any disclaimer, the term of this patent is extended or adjusted under 35 U.S.C. 154(b) by 779 days.

(21) Appl. No.: 15/388,800

(22) Filed: Dec. 22, 2016

(65) Prior Publication Data
US 2017/0182643 A1 Jun. 29, 2017

(30) Foreign Application Priority Data
Dec. 23, 2015 (FR) ...................... 15 63263

(51) Int. Cl.
*B25B 31/00* (2006.01)
*B25B 27/16* (2006.01)
(Continued)

(52) U.S. Cl.
CPC ........... *B25B 31/005* (2013.01); *B21J 15/043* (2013.01); *B21J 15/045* (2013.01); *B23P 19/10* (2013.01);
(Continued)

(58) Field of Classification Search
CPC ....... B25B 27/16; B25B 27/00; B25B 31/005; B25B 31/00; B23P 19/10; F16B 19/10; F16B 35/044; B64C 1/18; B64C 1/061
(Continued)

(56) References Cited

U.S. PATENT DOCUMENTS 1,394,608 A * 10/1921 Davern ................. F16B 35/044
411/390
2,570,618 A * 10/1951 Werner ................. B25B 31/005
29/271

(Continued)

FOREIGN PATENT DOCUMENTS

EP 2 915 740 A1 9/2015

OTHER PUBLICATIONS

French Search Report for Application No. 1563263 dated Aug. 30, 2016.

*Primary Examiner* — Lee D Wilson
*Assistant Examiner* — Seahee Hong
(74) *Attorney, Agent, or Firm* — Jenkins, Wilson, Taylor & Hunt, P.A.

(57) ABSTRACT

A method enabling two holes belonging to two parts to be aligned relies on use of a tool, comprising a body, having a first outer surface which gradually wanders from a longitudinal axis of the body as it extends from a first end of the body, and a hollow part having a second outer surface with a complementary section to the section of the holes. The hollow part comprises a hole through which it is removably mounted on the tool so that the second outer surface extends the first outer surface on an opposite side to the first end of the body. The method comprises inserting the first end of the body into the first hole, and then operating the tool to push the body and then the hollow part together into the holes. This method especially applies to the assembly of a floor module to an aircraft fuselage.

8 Claims, 6 Drawing Sheets

(51) Int. Cl.
*B25B 27/00* (2006.01)
*B64F 5/10* (2017.01)
*B23P 19/10* (2006.01)
*B60B 29/00* (2006.01)
*F16B 19/02* (2006.01)
*B21J 15/04* (2006.01)

(52) U.S. Cl.
CPC .............. *B25B 27/00* (2013.01); *B25B 27/16* (2013.01); *B60B 29/001* (2013.01); *B64F 5/10* (2017.01); *F16B 19/02* (2013.01); *B23P 2700/01* (2013.01)

(58) Field of Classification Search
USPC ............... 29/271, 468; 411/34, 35, 360, 361
See application file for complete search history.

(56) References Cited

U.S. PATENT DOCUMENTS

| | | | | |
|---|---|---|---|---|
| 3,232,162 A * | 2/1966 | Ketchum | .............. | F16B 19/008 |
| | | | | 29/243.522 |
| 3,725,993 A | 4/1973 | Siler | | |
| 3,817,146 A * | 6/1974 | Scott | ..................... | F16B 35/044 |
| | | | | 411/384 |
| 3,835,615 A | 9/1974 | King | | |
| 4,175,734 A * | 11/1979 | Williams | ............ | B23K 37/0408 |
| | | | | 269/49 |
| 4,388,031 A * | 6/1983 | Rodgers | ................. | F16B 19/086 |
| | | | | 411/43 |
| 4,610,064 A * | 9/1986 | Verstraeten | ............. | B25B 27/16 |
| | | | | 29/239 |
| 5,074,536 A | 12/1991 | McConkey | | |
| 5,252,014 A * | 10/1993 | Andrews | ............. | F16B 19/1054 |
| | | | | 29/525.05 |
| 5,689,873 A * | 11/1997 | Luhm | ..................... | B23B 41/00 |
| | | | | 29/525.11 |
| 5,799,408 A | 9/1998 | Sprayberry | | |
| 6,171,195 B1 | 1/2001 | Ferguson | | |
| 10,294,976 B2 * | 5/2019 | Bickford | ............. | F16B 19/1054 |
| 2006/0002782 A1* | 1/2006 | Elwell | ................... | B25B 31/005 |
| | | | | 411/57.1 |
| 2010/0251775 A1* | 10/2010 | Regnier | ................. | C03C 13/047 |
| | | | | 65/400 |
| 2012/0034045 A1* | 2/2012 | Luhm | ................. | F16B 19/1045 |
| | | | | 411/360 |
| 2014/0110529 A1* | 4/2014 | Guering | ................... | B64C 1/061 |
| | | | | 244/119 |
| 2015/0251775 A1* | 9/2015 | Durnad | ................... | B64C 1/061 |
| | | | | 244/131 |

* cited by examiner

METHOD FOR ALIGNING A FIRST HOLE OF A FIRST PART WITH A SECOND HOLE OF A SECOND PART AND KIT FOR ITS IMPLEMENTATION

CROSS-REFERENCE TO RELATED APPLICATION

This application claims priority to French Patent Application FR 15 63263 filed Dec. 23, 2015, the entire disclosure of which is incorporated by reference herein.

TECHNICAL FIELD

The present disclosure relates to a method for aligning a first hole of a first part with a second hole of a second part, the first and second holes having similar respective cross sections.

This method is in particular applicable to aircraft parts. For example, one of the parts may be an aircraft floor crosspiece, the other part then being a circumferential frame of an aircraft fuselage.

BACKGROUND

In the known methods for assembling aircraft, the floor crosspieces are installed one by one in a purely structural environment. Indeed, their mode of installation, comprising in particular steps of machining attachment holes, means that system elements cannot be close by since these elements are vulnerable.

However, it is possible to install multiple floor crosspieces at the same time, with relatively fragile systems close by.

To that end, it is desirable to be able to avoid steps of machining the attachment holes at this stage of assembly, and thus to carry out assembly using previously machined attachment holes.

However, the manufacturing tolerances of the parts are such that it is not possible to guarantee that the previously machined attachment holes will line up with one another with sufficient precision to ensure a good structural connection, this precision typically being of the order of a few hundredths of a millimeter.

Similar considerations apply with regard to the assembly of other types of modules of the aircraft.

SUMMARY

The disclosure herein has in particular the object of providing a simple, economical and effective solution to this problem.

To that end, a method is disclosed for aligning a first hole of a first part with a second hole of a second part, the first and second holes having similar respective cross sections, the method comprising:
  providing a tool, comprising a body centered on a longitudinal axis and having a first outer surface that is progressively further from the longitudinal axis with increasing distance from a first end of the body, and providing a hollow part having a second outer surface whose cross section matches the cross section of each of the first and second holes and whose longitudinal extent is greater than a depth of the first hole, the hollow part comprising a hole by which the hollow part is removably mounted on the tool such that the second outer surface extends continuously with the first outer surface on a side opposite the first end of the body,
  positioning the first part and the second part such that the first and second holes are at least partially facing one another, then
  inserting the first end of the body into the first hole, then maneuvering the tool so as to push the body of the tool then the hollow part together into the first hole then into the second hole, then
  disconnecting the body of the tool and the hollow part such that the hollow part remains lodged in the first hole and in the second hole.

The variation in cross section of the first outer surface of the body of the tool makes it possible, as the body advances through the holes, to progressively align these holes.

The method according to the disclosure herein thus provides an effective approach for aligning initially offset holes.

In the context of its particular application to fitting aircraft modules to the structure of an aircraft, the method according to the disclosure herein makes it possible to avoid carrying out machining operations during assembly, and thus makes it possible to limit the risk of damage to the systems fitted to such modules. Once the holes used for assembling the parts can be machined before the assembly operations, these operations may in effect be reduced to simple bolting operations or the like.

Preferably, the hollow part has a base, and maneuvering the tool is implemented until the base of the hollow part is pressed against the first part.

In a preferred embodiment of the disclosure herein, the body of the tool has a longitudinal hole which passes right through it, the hole of the hollow part is a through-hole, the tool comprises a tension screw comprising a shank having a threaded portion and a head, and the tool comprises a tension device comprising a bearing surface and a nut secured to the bearing surface.

The nut is configured so as to engage with the threaded portion of the shank, as will become more apparent below.

In the preferred embodiment of the disclosure herein, the method comprises inserting the shank of the tension screw into the hole of the hollow part and into the longitudinal hole of the body of the tool, such that the body of the tool and the head of the tension screw sandwich the hollow part, and such that the threaded portion of the shank projects from the body of the tool beyond the first end of the body.

In the preferred embodiment of the disclosure herein, the method comprises a subsequent step of pressing the bearing surface of the tension device against the second part, on a side opposite the side of the first part.

In a preferred embodiment of the disclosure herein, maneuvering the tool comprises or consists of screwing the threaded portion of the shank into the nut of the tension device so as to cause a translation of the tension screw through the first and second holes by a "nut-and-bolt" effect.

Moreover, the tension device advantageously comprises an antifriction member which locks the nut of the tension device in rotation during maneuvering of the tool.

Preferably, the hole of the hollow part has an internal thread, and the method comprises a subsequent step comprising or consisting of screwing an attachment screw into the hole of the hollow part so as to press a head of the attachment screw against the second part and to clamp together the first part and the second part.

Preferably, the body comprises an extension having an outer thread and extending beyond the first outer surface, on the opposite side from the first end of the body, and the method comprises a prior step comprising or consisting of mounting the hollow part removably onto the tool by screwing the extension of the body in the hole of the hollow part.

In one particular application of the method, one of the first and second parts is an aircraft floor crosspiece and the other of the first and second parts is a circumferential frame of an aircraft fuselage.

The disclosure herein also relates to a kit comprising, on one hand, a tool comprising a body centered on a longitudinal axis and having a first outer surface that is progressively further from the longitudinal axis with increasing distance from a first end of the body, and on the other hand, at least one hollow part having a second outer surface and comprising a hole by which the hollow part may be removably mounted on the tool such that the second outer surface extends continuously with the first outer surface on a side opposite the first end of the body.

Preferably, the body has a longitudinal hole which passes through it, the hole of the hollow part is a through-hole, the tool comprises a tension screw comprising a shank able to pass through the hole of the hollow part and the longitudinal hole of the body and having a threaded portion, and a head, and the tool comprises a tension device, comprising a bearing surface, and a nut secured to the bearing surface, spaced apart from the latter, and configured to make it possible to screw the threaded portion of the shank into the nut.

Preferably, the bearing surface extends perpendicular to the longitudinal axis of the body when the threaded portion of the shank is screwed into the nut.

BRIEF DESCRIPTION OF THE DRAWINGS

The disclosure herein will be better understood, and other details, advantages and features thereof will emerge on reading the following description, given by way of non-limiting example and with reference to the appended drawings, in which.

DETAILED DESCRIPTION

Figure 1:
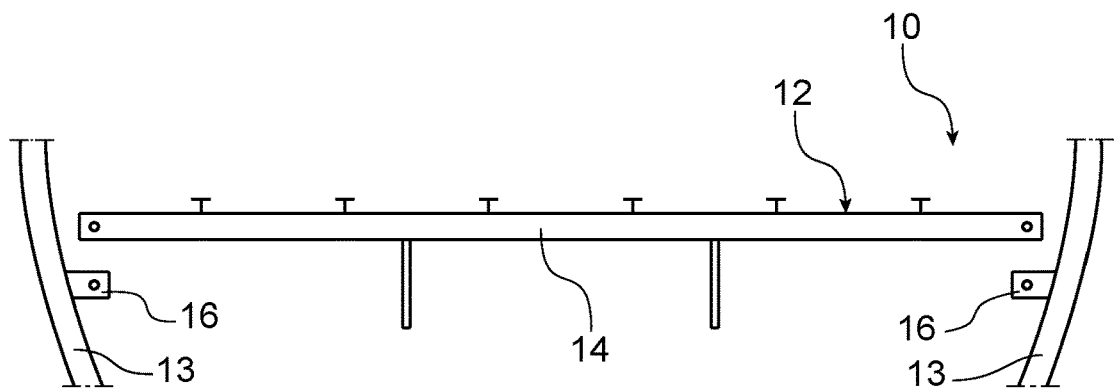
FIGS. 1 and 2 are partial schematic views in cross section of an aircraft fuselage, respectively before and after attachment of a floor crosspiece to a circumferential frame of the fuselage.

FIG. 1 shows part of an aircraft fuselage 10 comprising in particular circumferential frames, and an aircraft floor module 12 comprising in particular floor crosspieces, before the module is fitted to the fuselage. FIG. 1 shows in particular two lateral portions of one of the circumferential frames 13, and a floor crosspiece 14.

Figure 2:
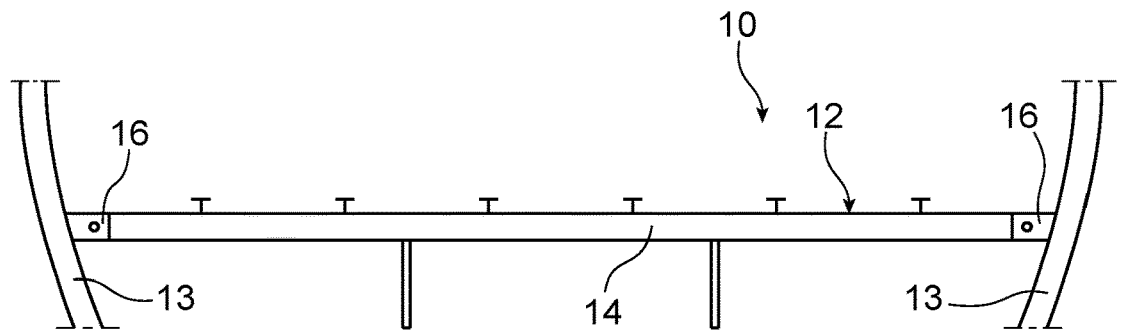

FIG. 2 shows the same elements after the module 12 has been fitted to the fuselage, and illustrates in particular the floor crosspiece 14 attached to the two lateral portions of the circumferential frame 13. To that end, the lateral portions of the circumferential frame 13 have respective attachment plates 16 which extend, toward one another, proud of the frame, and which each comprise a respective first hole, and the floor crosspiece 14 has two opposite ends each provided with a respective second hole.

Figure 3:
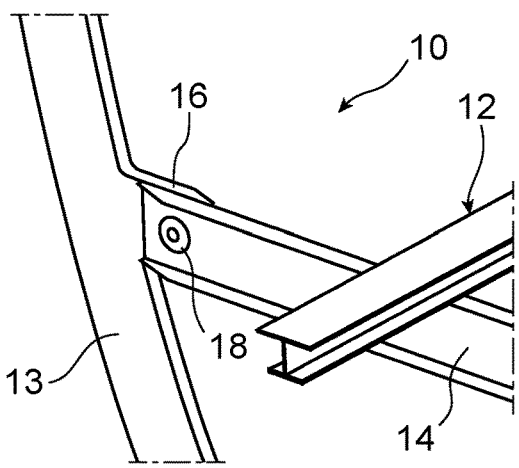
FIGS. 3 and 4 are perspective views at a larger scale than FIG. 2, showing respectively a front side and a rear side of a connection region between the floor crosspiece and the circumferential frame of the fuselage.
Figure 4:
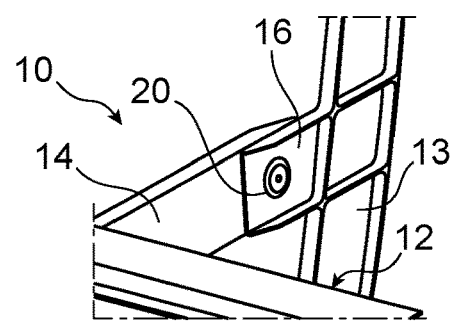

Attaching each one of the two ends of the floor crosspiece 14 to the corresponding attachment plate 16 is effected by a corresponding hollow part 18 which forms a nut (FIG. 3) and is lodged together in the corresponding first hole of the floor crosspiece 14 and in the corresponding second hole of the attachment plate 16, and by a corresponding attachment screw 20 screwed into the hollow part 18 (FIG. 4).

Figure 5:
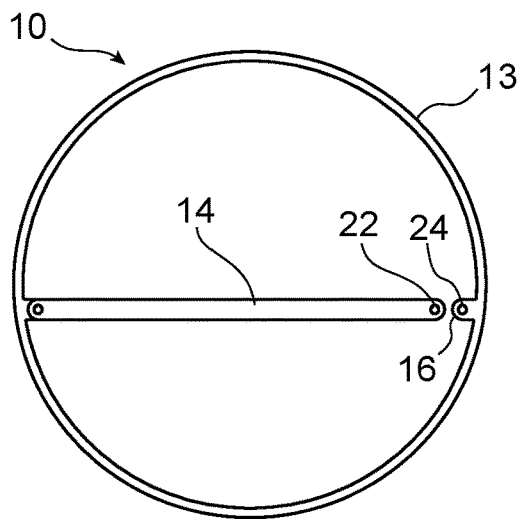
FIG. 5 is a partial schematic view in cross section of an aircraft fuselage, showing a problem of misalignment between attachment holes belonging respectively to the floor crosspiece and to the circumferential frame of the fuselage.

However, attaching the module 12 to the circumferential frames requires a very precise alignment of the first and second holes, which manufacturing tolerances are initially unable to provide, as shown in FIG. 5 in which the misalignment between a first hole 22 and a corresponding second hole 24 is greatly exaggerated for illustrative purposes, the misalignment being typically of the order of a few millimeters. It is therefore necessary to realign these holes a posteriori.

The disclosure herein proposes, to that end, a method for aligning a first hole of a first part, such as the hole 22 of the floor crosspiece 14, with a second hole of a second part, such as the hole 24 of the corresponding attachment plate 16.

This method involves the use of a kit comprising a tool 30 associated with at least one hollow part such as the above-mentioned hollow part 18.

Figure 6:
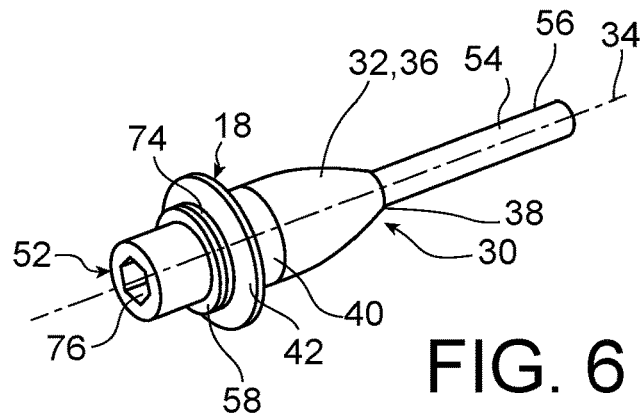
FIG. 6 is a partial schematic perspective view of a kit designed for implementing an alignment method according to a preferred embodiment of the disclosure herein.
Figure 7A:
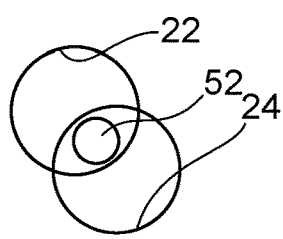
FIG. 7a is a schematic front view of the holes, showing their initial misalignment.
Figure 7:
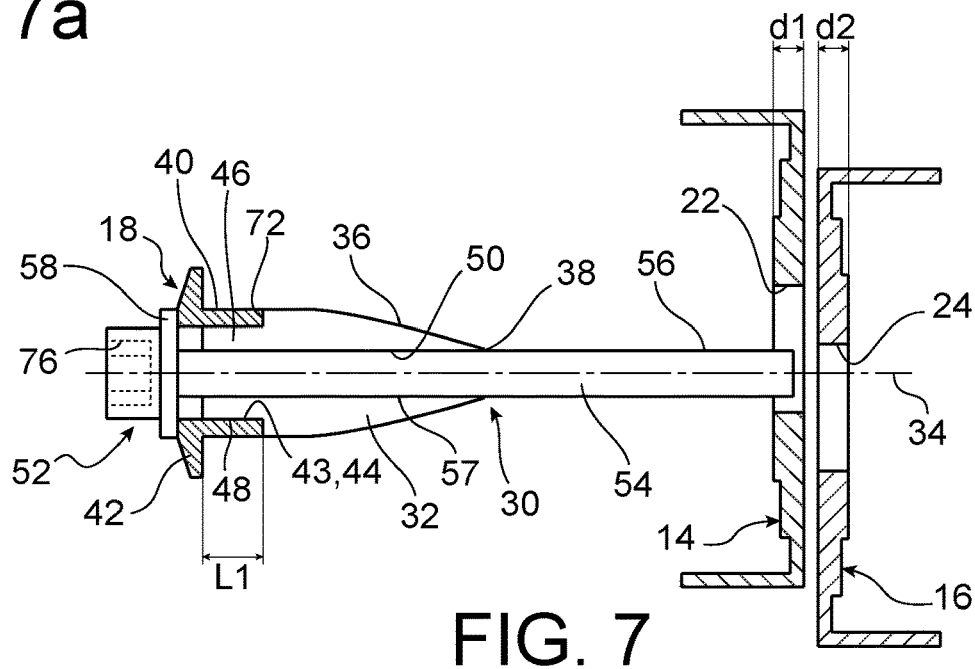
FIGS. 7 through 14 are partial schematic views in section of two parts provided with respective holes to be aligned, and illustrate implementation of the alignment method according to the preferred embodiment of the disclosure herein.
Figure 15:
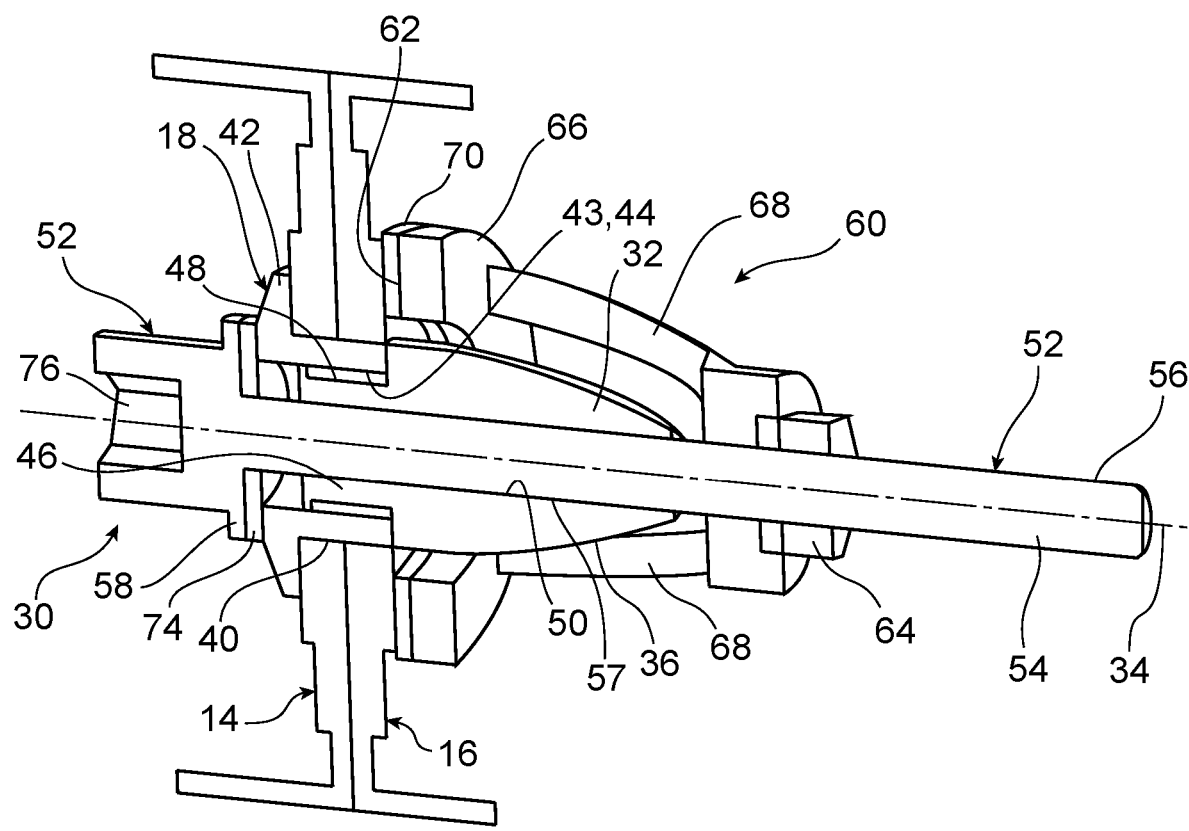
FIG. 15 is a schematic perspective section view of the kit, during implementation of the alignment method according to the preferred embodiment of the disclosure herein.

In general terms, the tool 30 comprises a body 32 centered on a longitudinal axis 34 and having a first outer surface 36 that is progressively further from the longitudinal axis 34 with increasing distance from a first end 38 of the body 32 (FIGS. 6, 7 and 15). In other words, the first outer surface 36 has a shape that widens from the first end 38 of the body 32.

Moreover, the hollow part 18 has a second outer surface 40 whose cross section essentially matches the cross section of each of the first and second holes 22, 24 and whose longitudinal extent L1 is greater than the depth d1 of the first hole 22 and preferably equal to or greater than the sum of the depth d1 of the first hole 22 and the depth d2 of the second hole 24 (FIG. 7). "Essentially matching cross section" is intended to mean that the cross section of the second outer surface 40 may match or be slightly larger in diameter than the cross section of each of the first and second holes 22, 24, to allow a tight or interference fit of the hollow part 18 in the holes 22, 24, as will be more apparent in the following.

Finally, the hollow part 18 fits removably onto the tool 30 such that the second outer surface 40 extends continuously with the first outer surface 36 on a side opposite the first end 38 of the body 32, as will be more apparent in the following. This should be understood as meaning that the second outer surface 40 extends in continuation of the first outer surface 36, that is to say forming no unevenness with the latter.

In the preferred example shown, the body 32 is axisymmetric about the longitudinal axis 34, that is to say that it has, at all points, a circular cross section centered on the longitudinal axis 34 (FIGS. 6, 7 and 15). Of course, the diameter of this cross section increases along the longitudinal axis 34 from the first end 38 of the body 32.

In addition, the hollow part 18 is in the form of a flange nut, and therefore has a base 42 and a through-hole 43 provided with an internal thread 44. Indeed, in the preferred embodiment of the disclosure herein, the method comprises a final step of clamping the two parts by the hollow part 18, as will be more apparent in the following.

The continuous nature of the hole 43 is designed to permit the passage of a tension screw, designed to maneuver the tool 30, through the hollow part 18, as will be more apparent in the following.

As a variant, the hole 43 may not be continuous, when another mechanism is provided for maneuvering the tool 30. The hole 43 is in this case a blind hole that is open on the side of the body 32 of the tool when the hollow part 18 is mounted on the tool 30.

As another variant, the method according to the disclosure herein may not comprise the final step of tightening the two parts, and the hollow part 18 may be a simple centering pin or the like. As the case may be, tightening the two parts 14 and 16 may then be done subsequently, for example by bolting through the centering pin.

In the embodiment shown, the body 32 comprises an extension 46 having an outer thread 48 and extending beyond the first outer surface 36, on the opposite side from the first end 38 of the body. The outer thread 48 is configured to screw into the internal thread 44 of the hollow part 18.

Furthermore, in the preferred embodiment of the disclosure herein, the body 32 has a longitudinal hole 50 which passes right through it.

Moreover, the tool 30 comprises a tension screw 52 comprising a shank 54 having a threaded portion 56 and a smooth portion 57, and a head 58. The threaded portion 56 and the head 58 are arranged on either side of the smooth portion 57.

The tool also comprises a tension device 60 (FIGS. 8 and 15), comprising a bearing surface 62 and a nut 64 secured to the bearing surface 62. In the example shown, the tension device 60 comprises a flat ring 66 on which is formed the bearing surface 62 and which is connected to the nut 64 by arcuate arms 68 creating between them a space for receiving the body 32. The nut 64 and the flat ring 66 are arranged coaxially, such that the bearing surface 62 extends perpendicular to a screwing axis defined by the nut 64 (and coincident with the longitudinal axis 34 in the figures).

In addition, the tension device 60 comprises antifriction member which may for example take the form of a first antifriction washer 70 (shown only in FIG. 15).

The steps of the alignment method according to the preferred embodiment of the disclosure herein are shown in FIGS. 7 through 14.

Initially, the first hole 22 and the second hole 24 are partially facing one another but are offset, as shown in FIGS. 7 and 7a.

The method comprises a prior step comprising or consisting in mounting the hollow part 18 removably onto the tool 30 by screwing the extension 46 of the body 32 into the hollow part 18, then a step comprising or consisting of inserting the smooth portion 57 of the shank 54 of the tension screw 52 in the longitudinal hole 50 of the body 32, such that the body 32 of the tool and the head 58 of the tension screw sandwich the hollow part 18, and such that the threaded portion 56 of the shank projects from the body 32 of the tool beyond the first end 38 of the body, as shown in FIGS. 6 and 7.

More precisely, the body 32 has a shoulder 72 (FIGS. 7 and 15) which connects the extension 46 of the body to the first outer surface 36, and which forms a stop with regard to the hollow part 18, preventing displacement of the latter relative to the body 32 parallel to the longitudinal axis 34.

In the example shown, a second antifriction washer 74 (shown only in FIGS. 6 and 15) is interposed between the head 58 of the tension screw 52 and the hollow part 18, in order to limit friction between the head 58 of the screw and the hollow part 18 during subsequent maneuvering of the tool 30, and thus avoid damaging the hollow part 18.

It should be noted that the longitudinal hole 50 has a smooth inner surface to allow rotation of the shank 54 with respect to the body 32.

In the example shown, the head 58 of the tension screw 52 has a hexagonal drive socket 76. Other head shapes are of course possible without departing from the scope of the disclosure herein.

FIG. 6 thus shows the assembly consisting on one hand of the tool 30 and of the hollow part 18 in its state at the end of the prior method steps described hereinabove.

The method then comprises a step comprising or consisting of:
  pressing the bearing surface 62 of the tension device 60 against the second part 16, on a side opposite the side of the first part 14 (FIG. 8), then,
  with the body 32 of the tool positioned on the side of the first part 14, inserting the threaded portion 56 of the shank 54 of the tension screw 52 then the first end 38 of the body 32 into the first hole 22, then
  maneuvering the tool 30 so as to push the body 32 of the tool then the hollow part 18 together into the first hole 22 then into the second hole 24.

The tool 30 is maneuvered by screwing the threaded portion 56 of the tension screw 52 into the nut 64 of the tension device 60, preferably by an electric screwdriver.

Figure 8:
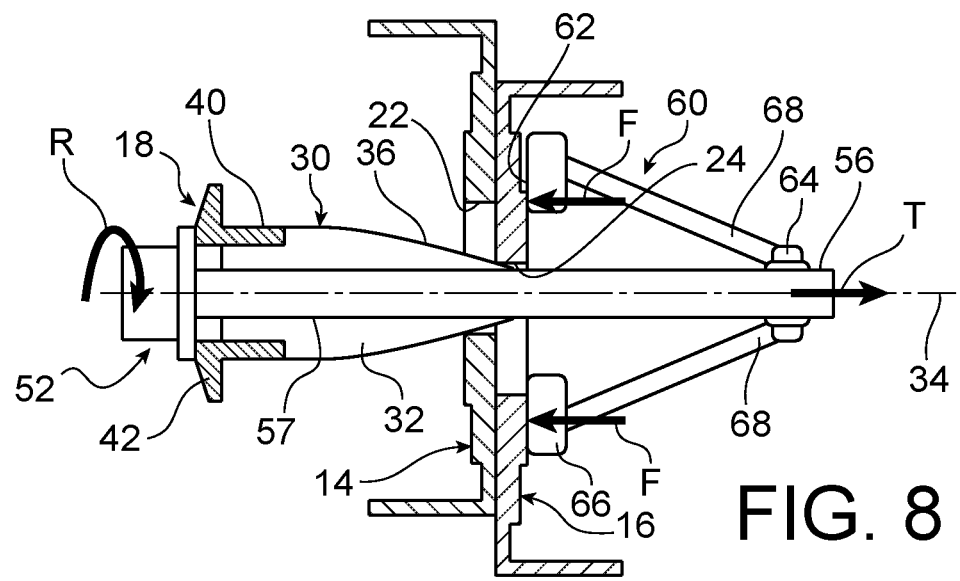
Figure 9:
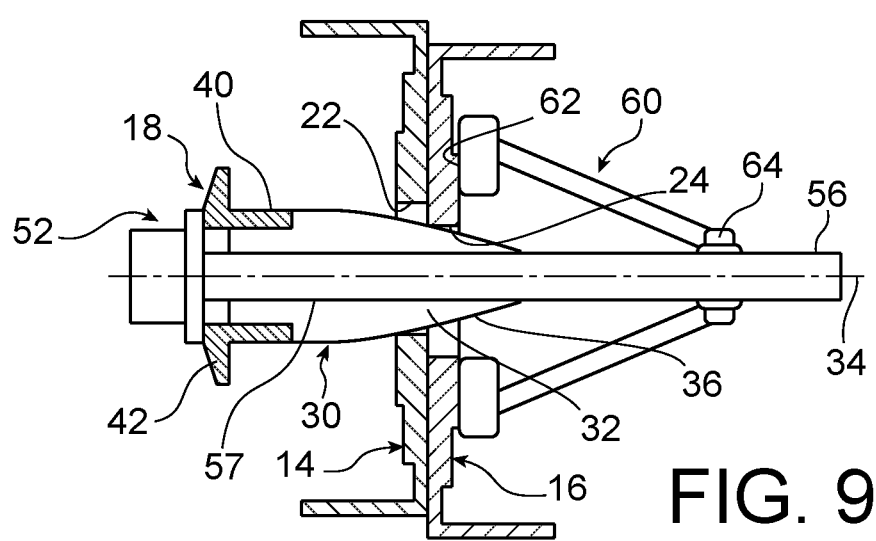
Figure 10:
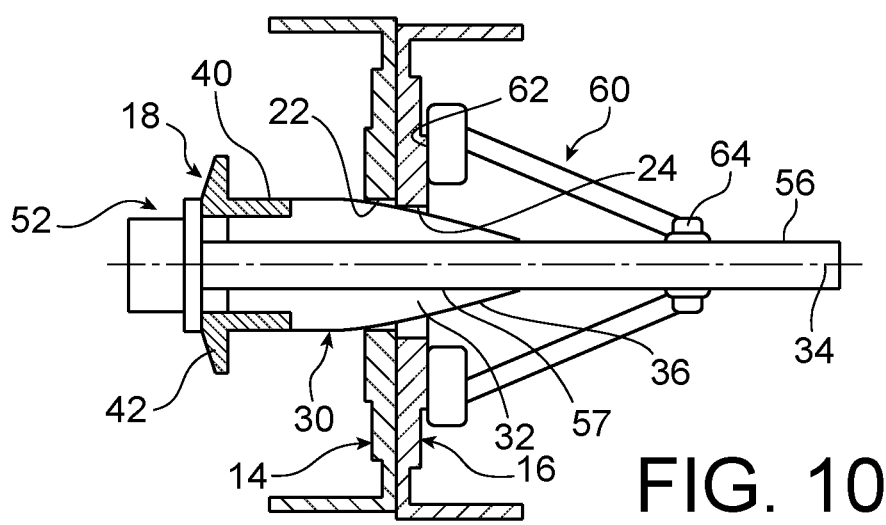
Figure 11:
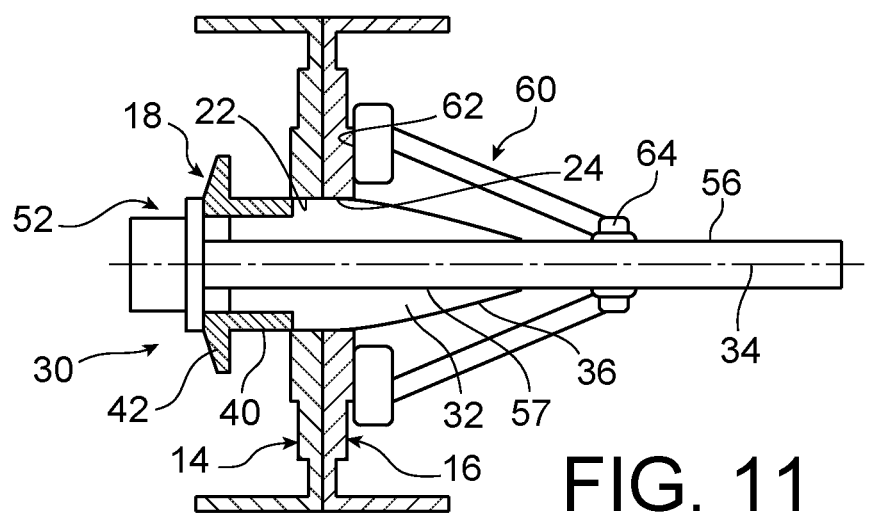

Due to the nut 64 being locked in rotation by the antifriction member, in this case the first antifriction washer 70 of FIG. 15, screwing the tension screw 52 into the nut 64, symbolized by the arrow R of FIG. 8, results in a reaction F that tends to press the bearing surface 62 of the tension device 60 against the second part 16, and thus produces translation T of the tension screw 52 through the first and second holes 22, 24 by a "nut-and-bolt" effect.

Hence, the head 58 of the tension screw 52 pushes the body 32 then the hollow part 18 through the first and second holes 22, 24.

The variable-cross-section shape of the first outer surface 36 of the body 32 then makes it possible, as the body 32 advances through the holes 22, 24, to progressively align these holes, as shown in FIGS. 8 through 12.

Figure 12:
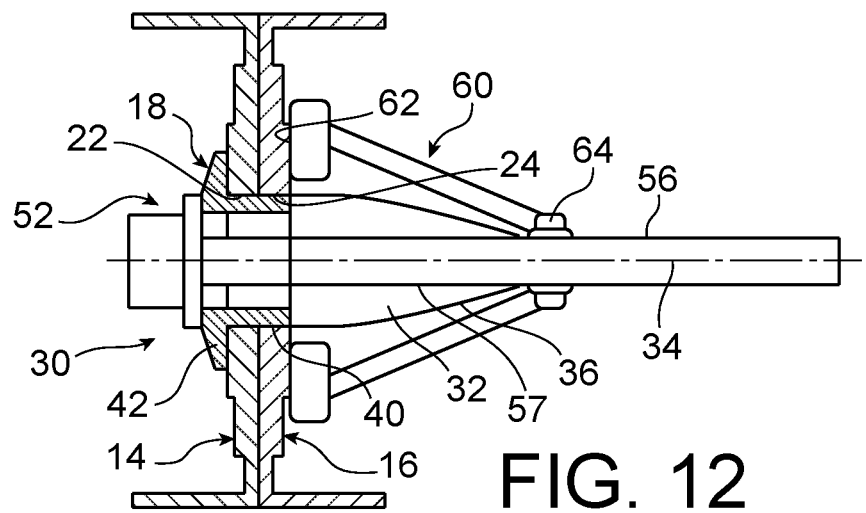

At the end of the step of maneuvering the tool 30, the hollow part 18 is lodged in both the first and second holes 22, 24 (FIG. 12). In the preferred embodiment of the disclosure herein, the base 58 of the hollow part 18 is then pressed against the first part 14.

Moreover, the body 32 of the tool is received in the space created between the arms 68 of the tension device 60. In particular, the bearing surface 62 surrounds the body 32 of the tool.

In general, other shapes are possible insofar as the bearing surface 62 and the mechanism connecting it to the nut 64 are concerned. The bearing surface 62 may for example not be a continuous surface as in the example shown, but be made of several separate surfaces. It is thus possible for the bearing surface 62 not to surround the body 32 at the stage of the method described above with reference to FIG. 12 but, in all cases, in any cross-sectional plane passing through the longitudinal axis 34, the bearing surface 62 extends at a distance from the longitudinal axis 34, this being greater than the distance between the second outer surface 40 of the hollow part 18 and the longitudinal axis 34 in order to permit the passage of the body 32.

Figure 13:
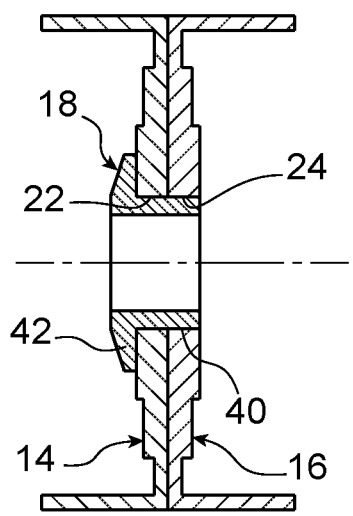

The method continues with a step comprising or consisting of disconnecting the body 32 of the tool and the hollow part 18, leaving the hollow part 18 lodged in the first hole 22 and in the second hole 24, as shown in FIG. 13. This step comprises or consists for example of withdrawing the tension device 60 by unscrewing its nut 64 from the threaded portion 56 of the tension screw 52, then in pulling the head 58 of the tension screw 52 so as to withdraw the tension screw 52 from the body 32, then finally in withdrawing the body 32 by unscrewing the extension 46 thereof from the hollow part 18.

Figure 14:
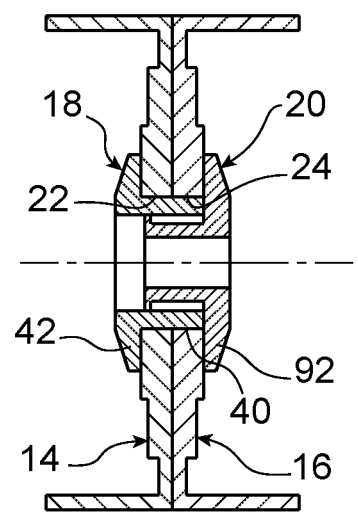

In the preferred embodiment of the disclosure herein, the method comprises a subsequent step comprising or consisting of screwing the attachment screw 20 into the hollow part 18 so as to press a head 92 of the attachment screw 20 against the second part 16 (FIG. 14). The base 42 of the hollow part 18 and the head 92 of the attachment screw 20 thus clamp together the first part 14 and the second part 16.

Fitting the hollow part 18 in the holes 22, 24 may thus be carried out with great precision of adjustment, which permits optimum transfer of shear forces between the two parts 14 and 16.

Optionally, additional tension bolts (not shown in the figures) may be used close to the holes 22, 24 in order to ensure that the first part 14 is properly clamped to the second part 16, and thus guarantee the effectiveness of the shear loading of the hollow part 18. To that end, these traction bolts are installed with a large amount of play in corresponding holes of the two parts 14 and 16.

Moreover, the holes 22 and 24 may be formed directly in the parts 14 and 16, as in the example described above. As a variant, these holes 22 and 24 may be formed in collars that are themselves installed in holes formed in the parts 14 and 16.

In general terms, the method and the kit according to the disclosure herein thus offer an effective means for aligning initially offset holes.

In their particular application for fitting aircraft modules to the structure of an aircraft, the method and the kit according to the disclosure herein make it possible to avoid the implementation of machining operations during assembly, and thus make it possible to limit the risk of damaging systems fitted to such modules. Indeed, assembly may be reduced to simple bolting operations.

In the particular case of applying the method and kit according to the disclosure herein to the attachment of the floor crosspiece 14 to the circumferential fuselage frame 13, the method according to the disclosure herein makes it possible to subject the circumferential frame 13 to a slight stress by deforming it sufficiently to make the holes 22 of the floor crosspiece line up with the corresponding holes 24 of the plate 16 of the circumferential frame 13.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for aligning a first hole of a first part with a second hole of a second part, the first and second holes having similar respective cross sections, the method comprising:

providing a tool, comprising a body centered on a longitudinal axis and having a first outer surface that is progressively further from the longitudinal axis with increasing distance from a first end of the body;

providing a hollow part having a second outer surface whose cross section essentially matches the cross section of each of the first and second holes and whose longitudinal extent is greater than a depth of the first hole, the hollow part comprising a hole by which the hollow part is removably mounted on the tool such that the second outer surface extends continuously with the first outer surface on a side opposite the first end of the body;

positioning the first part and the second part such that the first and second holes are at least partially facing one another; then inserting the tool in the first hole such that the first end of the body is followed by the first outer surface; then maneuvering the tool so as to push the body of the tool and then the hollow part together into the first hole then into the second hole to progressively align the first and second holes; then disconnecting the body of the tool and the hollow part such that the hollow part remains lodged in the first hole and in the second hole;

wherein:

the body of the tool has a longitudinal hole which passes through the body;

the hole of the hollow part is a through-hole;

the tool comprises a tension screw comprising a shank having a threaded portion and a head; and the tool comprises a tension device, comprising a bearing surface, and a nut secured to the bearing surface;

the method comprising inserting the shank of the tension screw in the hole of the hollow part and in the longitudinal hole of the body of the tool, such that the body of the tool and the head of the tension screw sandwich the hollow part, and such that the threaded portion of the shank projects from the body of the tool beyond the first end of the body;

the method comprising a subsequent step of pressing the bearing surface of the tension device against the second part, on a side opposite the side of the first part;

and wherein the maneuvering the tool comprises screwing the threaded portion of the shank into the nut of the tension device to cause a translation of the tension screw through the first and second holes by a nut-and-bolt effect.

2. The method as claimed in claim 1, wherein the hollow part has a base, and wherein the maneuvering the tool is implemented until the base of the hollow part is pressed against the first part.

3. The method as claimed in claim 1, wherein the tension device comprises an antifriction member which locks the nut of the tension device in rotation during the maneuvering the tool.

4. The method as claimed in claim 1, wherein the hole of the hollow part has an internal thread, the method comprising a subsequent step of screwing an attachment screw into the hole to press a head of the attachment screw against the second part and to clamp together the first part and the second part.

5. The method as claimed in claim 4, wherein the body comprises an extension having an outer thread and extending beyond the first outer surface, on the opposite side from the first end of the body, the method comprising a prior step of the mounting of the hollow part removably onto the tool by screwing the extension of the body into the hole of the hollow part.

6. The method as claimed in claim 1, wherein one of the first and second parts comprises an aircraft floor crosspiece and another of the first and second parts comprises a circumferential frame of an aircraft fuselage.

7. A kit for implementing the method as claimed in claim 1, the kit comprising the tool and
   at least one of the hollow part;
   wherein the body has a longitudinal hole which passes through the body, the hole of the hollow part is a through-hole, the tool comprises a tension screw comprising a shank able to pass through the hole of the hollow part and the longitudinal hole of the body and having a threaded portion, and a head, and the tool comprises a tension device, comprising a bearing surface, and a nut secured to the bearing surface, spaced apart from the latter, and configured to screw the threaded portion of the shank into the nut.

8. The kit as claimed in claim 7, wherein the bearing surface extends perpendicular to the longitudinal axis of the body when the threaded portion of the shank is screwed into the nut.

\* \* \* \* \*